US009856830B2

(12) United States Patent
    Dudar

(10) Patent No.: US 9,856,830 B2
(45) Date of Patent: Jan. 2, 2018

(54) SYSTEM AND METHODS FOR REDUCING VEHICLE EVAPORATIVE EMISSIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/991,764

(22) Filed: Jan. 8, 2016

(65) Prior Publication Data

US 2017/0198671 A1    Jul. 13, 2017

(51) Int. Cl.
    *F02M 26/13*    (2016.01)
    *F02M 25/08*    (2006.01)
    (Continued)

(52) U.S. Cl.
    CPC .......... *F02M 26/13* (2016.02); *F02D 41/004* (2013.01); *F02D 41/042* (2013.01); *F02M 25/089* (2013.01); *F02M 25/0854* (2013.01); *F02M 35/0218* (2013.01); *F02M 35/104* (2013.01); *F02M 35/10019* (2013.01); *F02M 35/10222* (2013.01); *B60K 6/20* (2013.01); *F02D 41/0002* (2013.01); *F02D 41/221* (2013.01);
    (Continued)

(58) Field of Classification Search
    CPC ............. F02M 55/007; F02M 25/0854; F02M 25/089; F02M 35/104; F02M 35/10222; F02M 55/025; F02M 26/13; F02D 41/042; F02D 41/004; F02D 41/009; F02D 9/02
    See application file for complete search history.

(56) References Cited

U.S. PATENT DOCUMENTS 5,239,970 A    8/1993  Kurihara
5,685,268 A    11/1997 Wakemen
(Continued)

FOREIGN PATENT DOCUMENTS

JP    2001227421 A  *  8/2001
JP    2001234781 A  *  8/2001

OTHER PUBLICATIONS

Dudar, Aed M., "System and Methods for Purging Residual Exhaust and Uncombusted Fuel to a Fuel Vapor Canister," U.S. Appl. No. 14/606,779, filed Jan. 27, 2015, 52 pages.

*Primary Examiner* — Joseph Dallo
*Assistant Examiner* — Kurt Liethen
(74) *Attorney, Agent, or Firm* — James Dottavio; McCoy Russell LLP

(57) ABSTRACT

Methods and systems are provided for reducing evaporative emissions in a vehicle during engine-off conditions responsive to an indication of undesired fuel outflow from one or more fuel injectors. In one example, at an engine-off event, an electric motor is operated to spin a vehicle engine unfueled to position a cylinder receiving fuel from a fuel injector with undesired fuel outflow with an intake valve open and an exhaust valve closed, and subsequently an onboard vacuum pump is activated to purge the contents of the cylinder to a fuel vapor canister. In this way, upon detection of undesired fuel outflow from one or more fuel injectors, during engine-off conditions mitigating action may be undertaken such that the undesired fuel outflow is purged to the fuel vapor canister, rather than being released as vapors to the environment.

19 Claims, 8 Drawing Sheets

(51) Int. Cl.
   *F02D 41/00* (2006.01)
   *F02D 41/04* (2006.01)
   *F02M 35/104* (2006.01)
   *F02M 35/10* (2006.01)
   *F02M 35/02* (2006.01)
   *F02D 41/22* (2006.01)
   *F02D 41/38* (2006.01)
   *F02N 19/00* (2010.01)
   *B60K 6/20* (2007.10)

(52) U.S. Cl.
   CPC .. *F02D 2041/225* (2013.01); *F02D 2041/389* (2013.01); *F02D 2200/0602* (2013.01); *F02N 2019/008* (2013.01)

(56) References Cited

U.S. PATENT DOCUMENTS

| | | | |
|---|---|---|---|
| 6,581,580 B2 | 6/2003 | Trumpy et al. | |
| 7,233,845 B2 | 6/2007 | Veinotte | |
| 9,163,571 B2 * | 10/2015 | Dudar | F02M 25/089 |
| 2005/0011185 A1 * | 1/2005 | Annoura | F02D 41/0032 60/289 |
| 2006/0053868 A1 * | 3/2006 | Chung | B60K 6/44 73/49.7 |
| 2009/0260601 A1 * | 10/2009 | Ulrey | F02B 1/12 123/512 |
| 2013/0032127 A1 * | 2/2013 | Jentz | F02N 11/003 123/520 |
| 2015/0051812 A1 * | 2/2015 | Santillo | F02D 41/126 701/104 |

* cited by examiner

SYSTEM AND METHODS FOR REDUCING VEHICLE EVAPORATIVE EMISSIONS

FIELD

The present description relates generally to methods and systems for controlling a vehicle engine to reduce evaporative emissions responsive to an indication of undesired fuel outflow from one or more fuel injectors.

BACKGROUND/SUMMARY

Fuel delivery systems may include a direct fuel injector to inject fuel at high pressure directly into a cylinder. Highly pressurized fuel in the fuel delivery system may be particularly useful during crank and other times during engine operation for efficient combustion, etc. The direct fuel injector may deliver fuel in proportion to a fuel injector pulse width of a signal from an engine controller. However, due to aging, fuel contamination, or hardware failure, undesired fuel outflow from one or more fuel injectors may occur. Undesired fuel outflow from the fuel injector may cause the corresponding cylinder receiving fuel from the injector to misfire. Consequently, non-combusted air-fuel mixture may be displaced into the exhaust. The non-combusted air-fuel mixture in the exhaust may participate in an exothermic reaction at an exhaust catalyst generating excess amounts of heat. The heat generated may cause excessive increase in exhaust temperatures, which may result in thermal degradation of the exhaust components.

In some cases, depending on the amount of undesired fuel outflow from the fuel injector(s), an onboard control strategy may be able to correct for the undesired fuel outflow from the fuel injector(s) by leaning out the air/fuel ratio. However, while this corrective action can take place during conditions of engine operation, in other conditions correcting for undesired fuel outflow from the fuel injector(s) by leaning out the air/fuel ratio may not be possible. For example, during an idle stop or at key off, or in the example of a hybrid electric vehicle (HEV) driven in battery mode, undesired fuel outflow from the one or more fuel injector(s) may continue to add fuel into the one or more respective cylinder(s). The undesired outflow of fuel from one or more fuel injector(s) under circumstances wherein corrective action such as leaning out the air/fuel ratio is not possible can lead to potential issues including but not limited to hesitation/stumbles in the engine at startup, engine hydrolock, fuel smell in the vehicle cabin, increased emissions, etc. For example, depending on the position of the intake and exhaust valves at engine shutoff, unburned hydrocarbons inside the cylinder(s) may migrate to the intake or exhaust manifolds and escape to the atmosphere, resulting in increased evaporative emissions.

One example approach for mitigating undesired fuel outflow from a fuel injector is shown by Wakemen et al. in U.S. Pat. No. 5,685,268. Therein, in response to detecting leakage in the fuel delivery system, the engine may be operated in a limp-home mode at reduced fuel pressure.

However, the inventors herein have identified potential issues with such an approach. As an example, reducing fuel rail pressure alone may not prevent undesired fuel outflow from the fuel delivery system, therefore potential issues such as engine hydrolock, fuel smell in the vehicle cabin, increased emissions, etc., may not be mitigated.

In one example approach for mitigating the emission of hydrocarbon vapor to the atmosphere, U.S. Pat. No. 6,581,580 B2 teaches a vapor evacuation system that is used to intermittently remove hydrocarbon vapors from vehicle components to an available storage canister using an electrically-controlled pump.

However, the inventors herein have also recognized that such an approach may not be sufficient for reducing evaporative emissions responsive to undesired outflow of fuel from one or more fuel injectors, depending on the position of the intake and exhaust valves at engine shutoff. For example, if a cylinder is positioned with an intake valve closed and an exhaust valve open at engine shut-off, a pump may not be capable of evacuating fuel vapors to a vapor storage container, and increased evaporative emissions may result.

Thus, the inventors herein have developed systems and methods to at least partially address the above issues. In one example the issues described above may be addressed by a method including, monitoring a plurality of fuel injectors that each supply pressurized fuel to a plurality of cylinders in a combustion engine, and responsive to an indication of a fuel injector with undesired fuel outflow, following an engine-off event, positioning a cylinder that receives fuel from the fuel injector with an intake valve open and an exhaust valve closed, coupling the cylinder to a fuel vapor canister configured to store vaporized hydrocarbons, and activating a vacuum pump to purge fuel vapors resulting from the undesired fuel outflow through the intake valve to the fuel vapor canister.

As one example, positioning a cylinder that receives fuel from the fuel injector with an intake valve open and an exhaust valve closed includes spinning a vehicle engine unfueled with an onboard electric motor responsive to an engine-off event. In this way, upon detecting undesired fuel outflow from a fuel injector, at an engine-off event, the cylinder that receives fuel from the fuel injector with undesired fuel outflow may rapidly be configured with its intake valve open and exhaust valve closed, wherein a pump may subsequently be activated to purge fuel vapor in the cylinder to a fuel vapor canister, thereby reducing the potential for undesired evaporative emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5B:
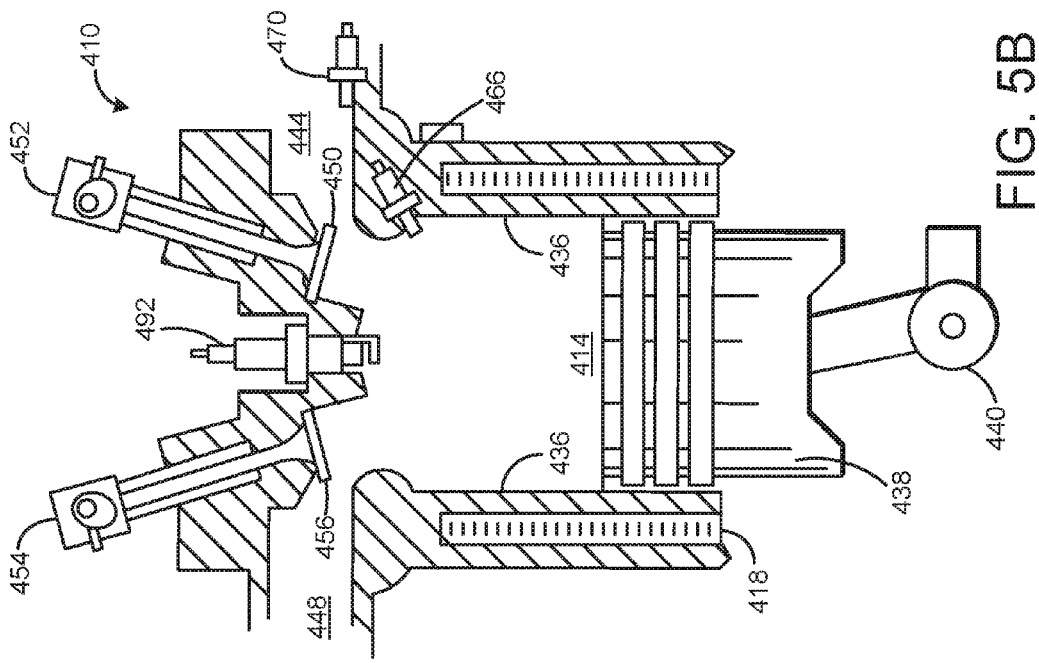
FIG. 5B schematically shows an example combustion cylinder with an open intake valve and an open exhaust valve.
Figure 5A:
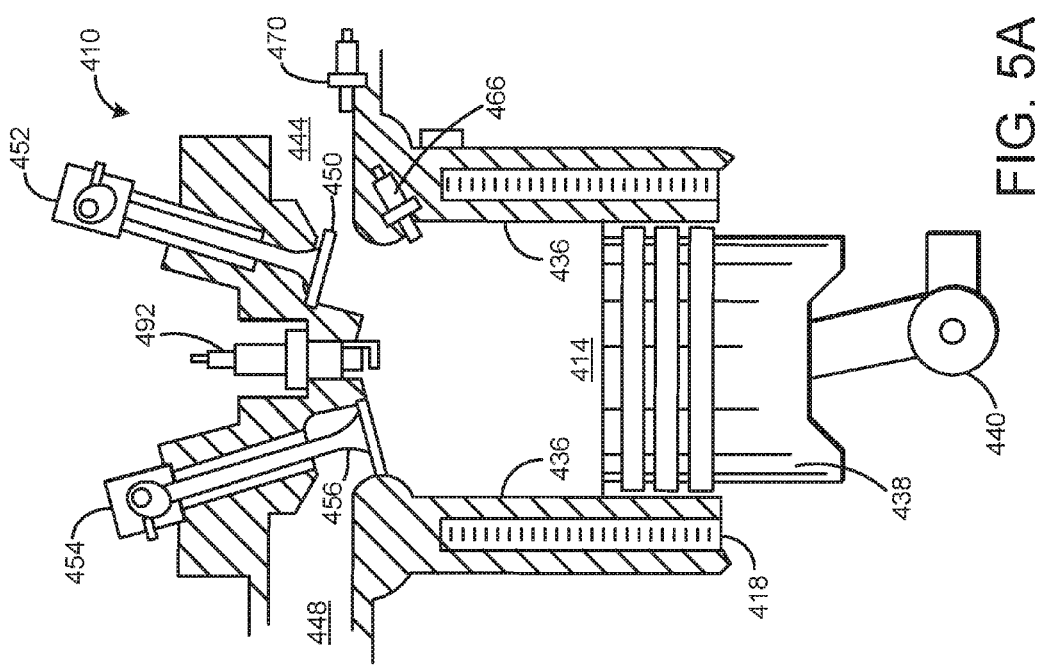
FIG. 5A schematically shows an example combustion cylinder with an open intake valve.
Figure 6:
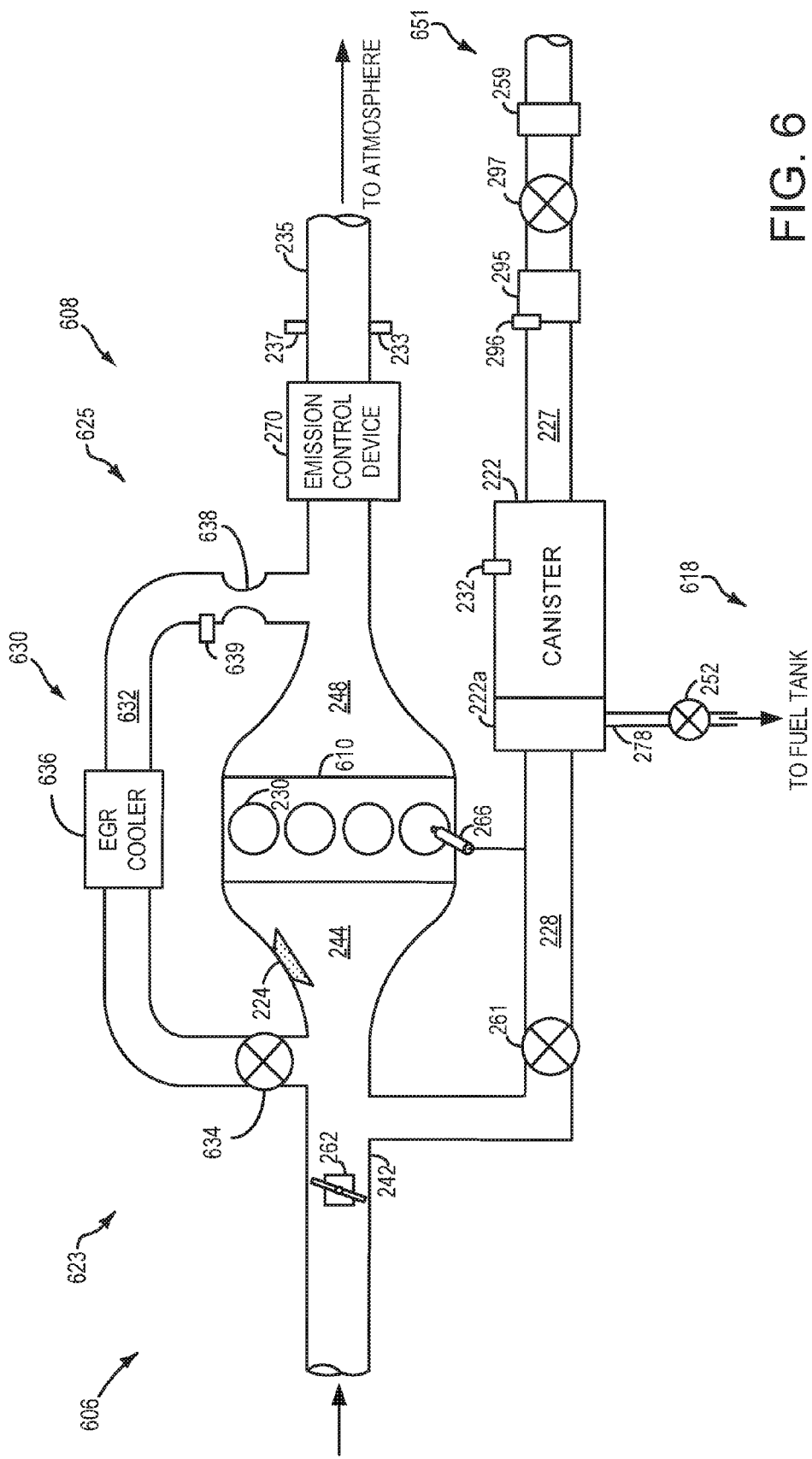
FIG. 6 schematically shows an example engine system with an exhaust gas recirculation system.
Figure 7:
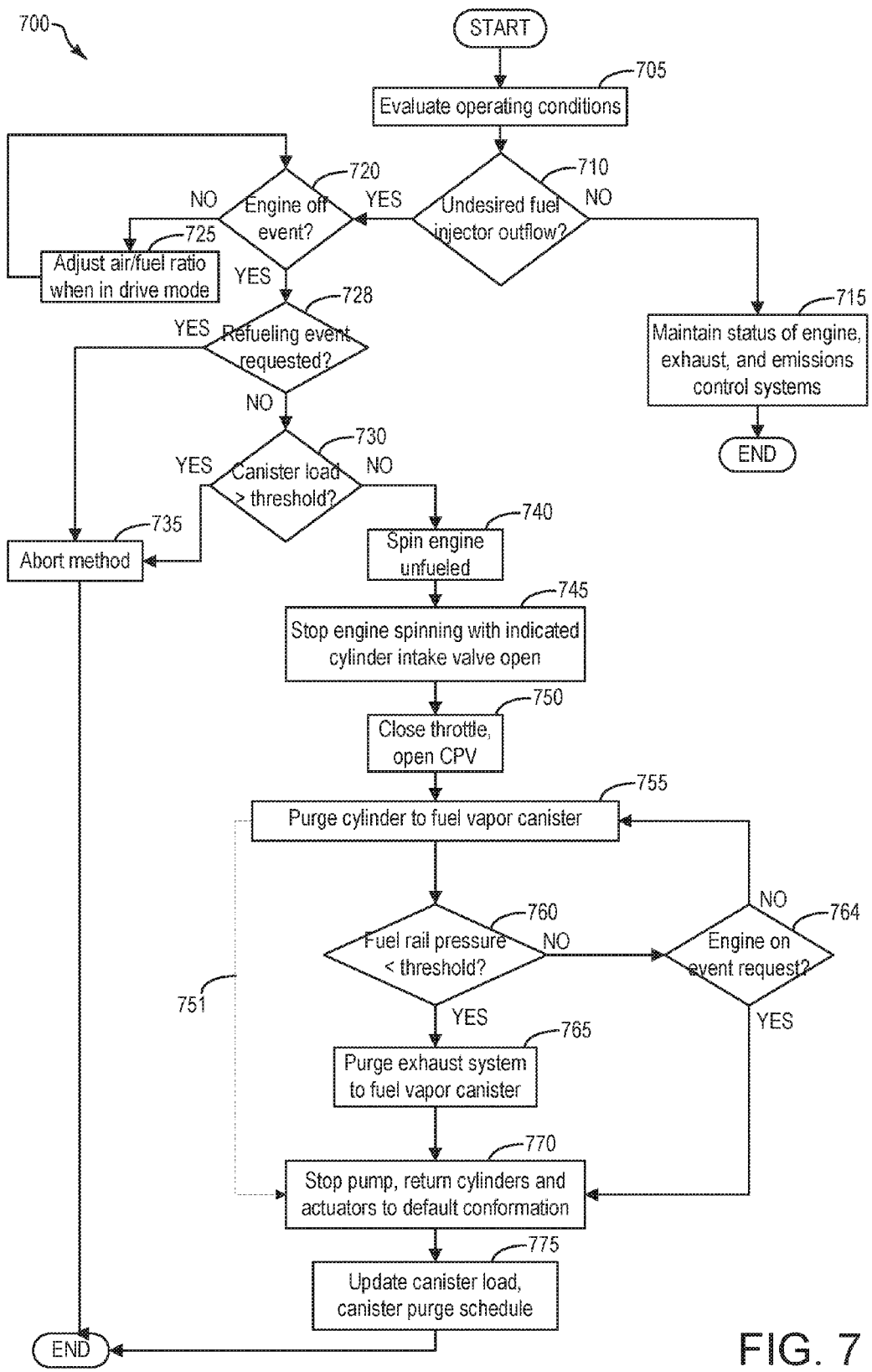
FIG. 7 shows a flowchart for an example method for reducing evaporative emissions responsive an indication of undesired fuel outflow from one or more fuel injectors.
Figure 8:
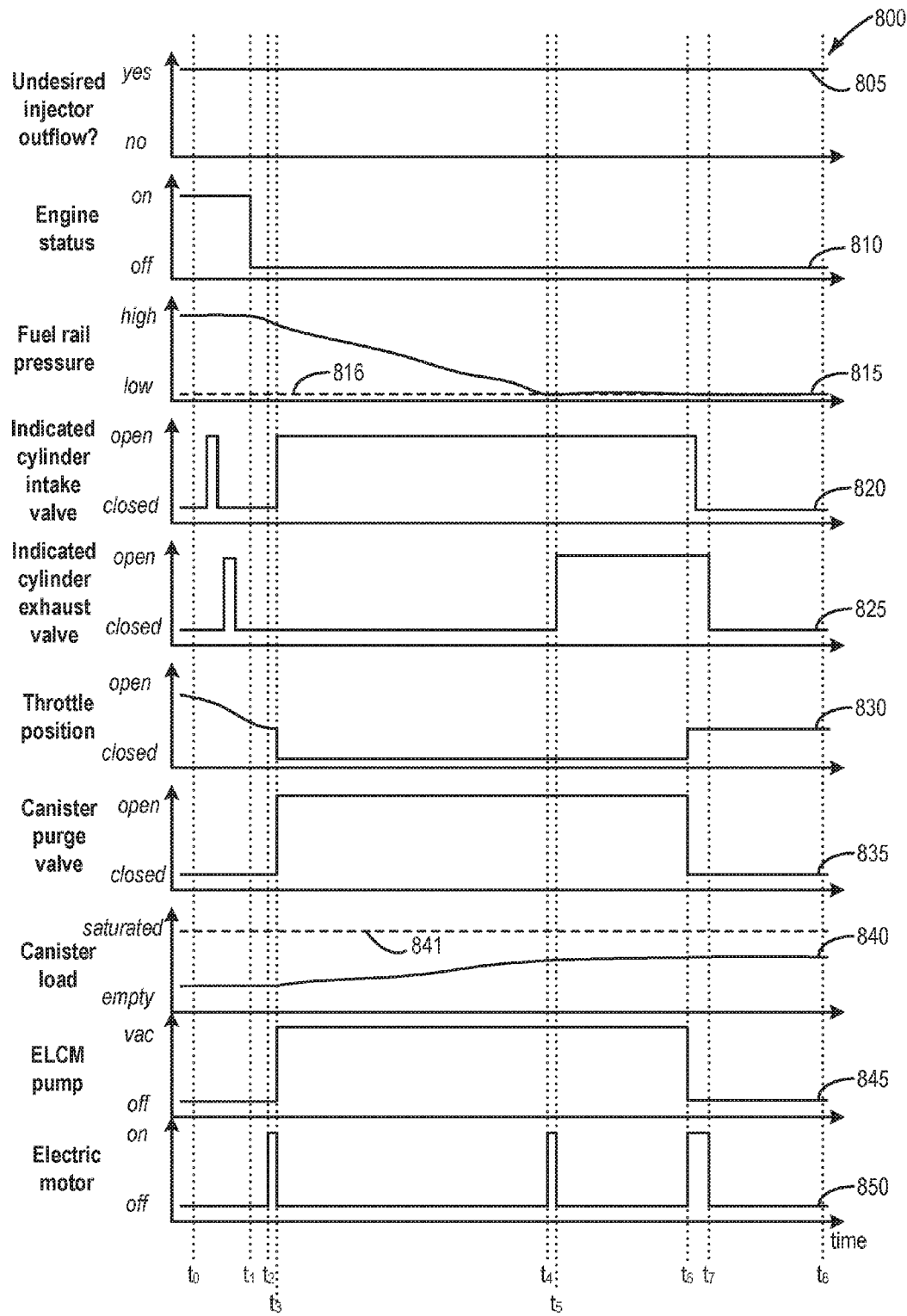
FIG. 8 shows a timeline for reducing evaporative emissions responsive to an indication of undesired fuel outflow from one or more fuel injectors according to the method depicted in FIG. 7.

This detailed description relates to systems and methods for purging fuel vapors resulting from undesired fuel outflow from one or more fuel injectors to a fuel vapor canister for storage. Specifically, the description relates to indicating whether undesired fuel outflow from one or more fuel injectors are occurring, and if so, responsive to an engine-off event, positioning the one or more cylinders with the intake valve open and exhaust valve closed, and applying vacuum to the one or more cylinders such that fuel vapors are drawn to the fuel vapor canister. The system and methods may be applied to a vehicle system capable of spinning an engine unfueled with an electric motor, such as the hybrid vehicle system depicted in FIG. 1. The engine may be coupled to an emissions control system and an exhaust system, as depicted in FIG. 2. Fuel injectors may be incorporated into a fuel delivery system, such as the fuel delivery system of FIG. 3 for delivering fuel to an engine as is shown in FIG. 2. The engine may comprise a plurality of combustion cylinders, such as the combustion cylinder depicted in FIG. 4. During a vehicle-off condition, the engine may be spun unfueled and stopped with the cylinder intake valve open, as shown in FIG. 5A. In this conformation, if a canister purge valve is opened, and an evaporative leak check module is activated to apply a vacuum to the fuel vapor canister, the vacuum will draw uncombusted fuel vapors from the engine cylinder into the fuel vapor canister. If the engine employs dual independent variable cam timing, the engine may be positioned with both the intake valve and the exhaust valve open, as shown in FIG. 5B. In this conformation, the exhaust system is coupled to the intake system. If vacuum is applied in this conformation, exhaust gas and uncombusted hydrocarbons within the exhaust manifold and exhaust line may be drawn into the fuel vapor canister. In engines employing an exhaust gas recirculation system, such as the engine system depicted in FIG. 6, an exhaust gas recirculation valve may be opened to couple the engine intake to the engine exhaust. A method for evacuating one or more engine cylinders and engine exhaust responsive to an indication of undesired fuel outflow from one or more fuel injectors is shown in FIG. 7. A timeline for evacuating the engine cylinders and exhaust according to the method of FIG. 7, is depicted in FIG. 8.

Figure 1:
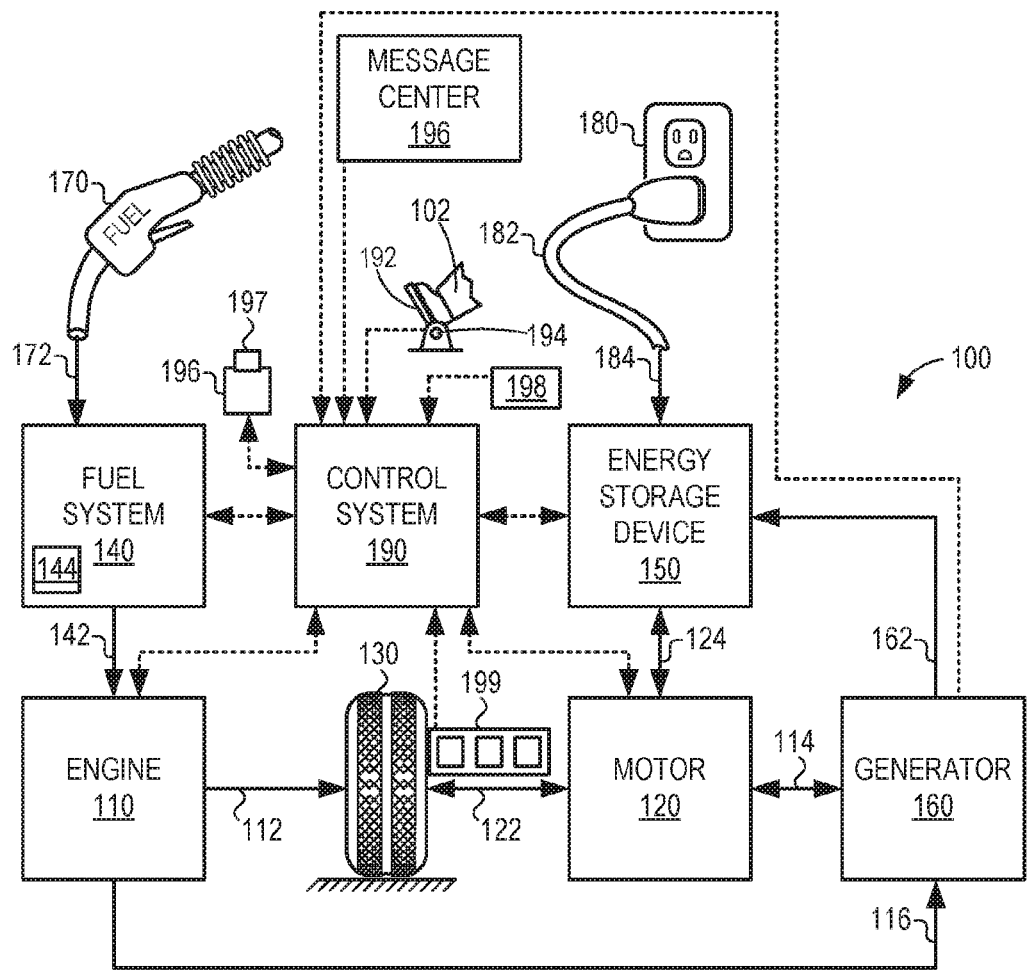
FIG. 1 schematically shows an example vehicle propulsion system.
Figure 2:
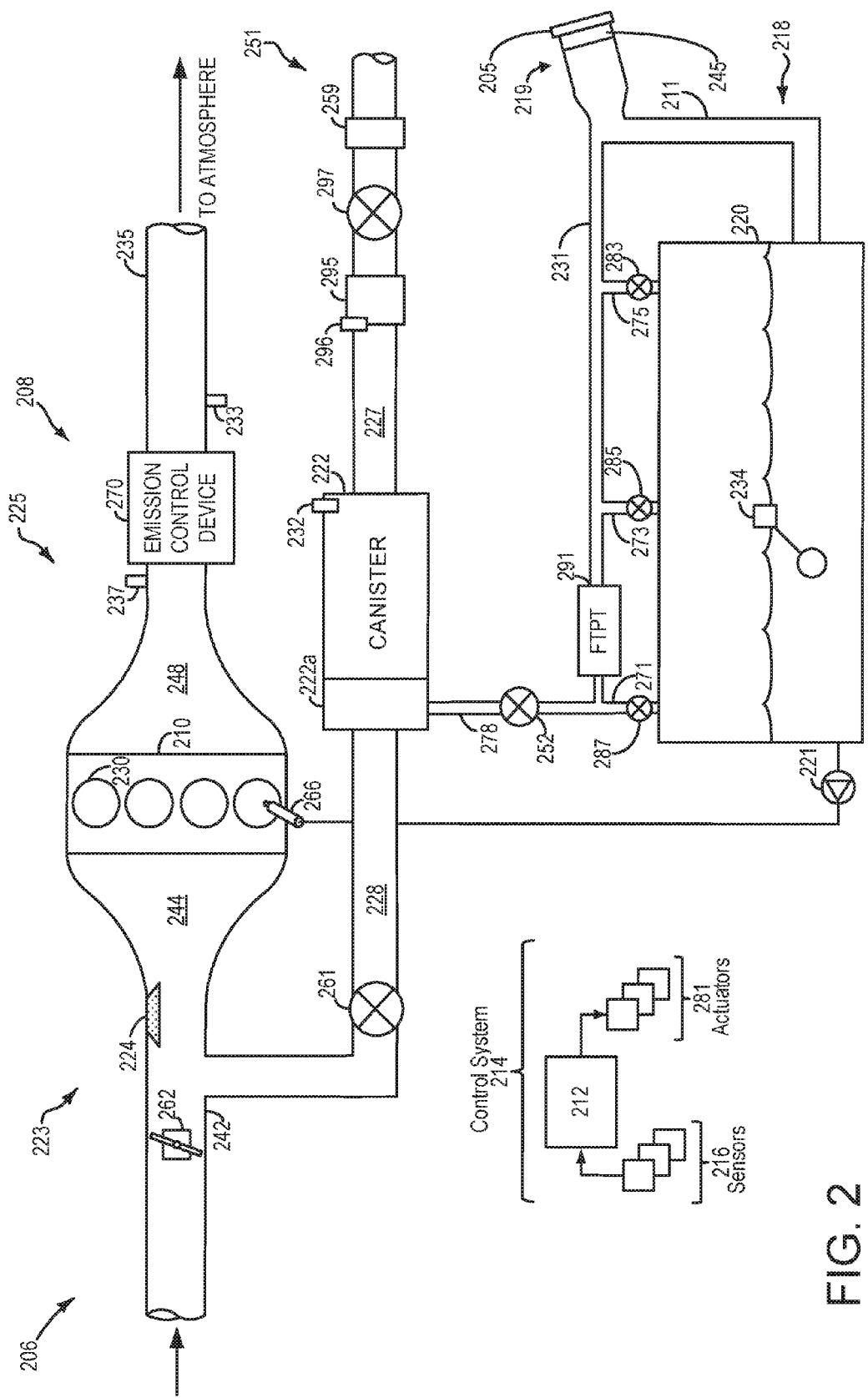
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. All the injectors in the example shown in FIG. 2 inject fuel directly into each cylinder (i.e., direct injection) rather than injecting fuel into or against an intake valve of each cylinder (i.e., port injection). Multiple fuel injector configurations will be described in greater detail later herein with particular reference to FIGS. 4, 5A, and 5B. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 232. Exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Other sensors such as pressure, temperature, and composition sensors may be coupled to various locations in the vehicle system 206. As another example, the actuators may include fuel injector 266, throttle 262, fuel tank isolation valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 7.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 218 to confirm that the fuel system is not degraded. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions tests may be performed by an evaporative level check monitor (ELCM) 295 communicatively coupled to controller 212. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, fuel system degradation may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
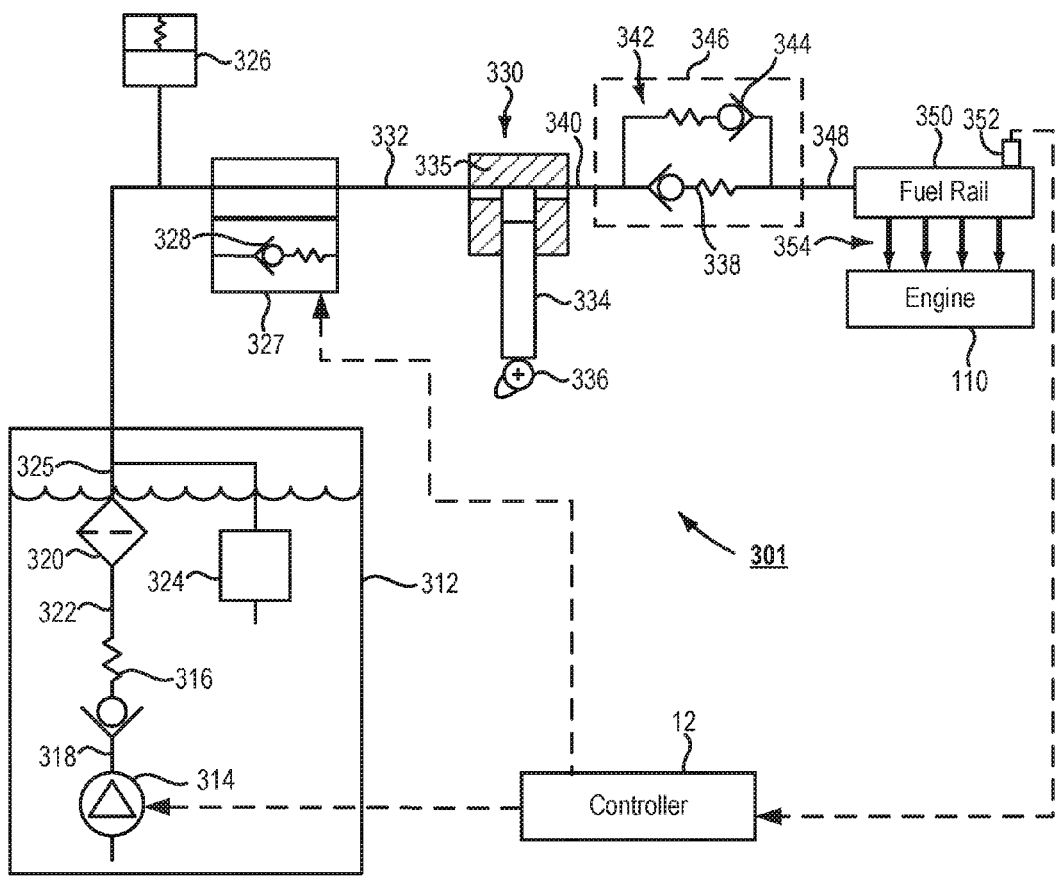
FIG. 3 shows a schematic depiction of a fuel delivery system for the internal combustion engine depicted at FIG. 1.

FIG. 3 shows a diagram of a fuel delivery system 301 that may be used to deliver fuel to the internal combustion engine 110, shown in FIG. 1 (or engine 210, shown in FIG. 2). The fuel delivery system may include a fuel tank 312 substantially surrounding a lower pressure fuel pump 314. In one example, the lower pressure fuel pump 314 may be an electronically actuated lift pump. In another example, lower pressure fuel pump 314 may be another suitable pump capable of delivering fuel at an increased pressure to downstream components, such as a rotodynamic pump. The lower pressure fuel pump 314 may be actuated by a command signal sent from controller 12. In some examples, a control module (not shown) may control the actuation of pump 314.

Furthermore, the lower pressure pump may increase the downstream pressure in the fuel delivery system. The lower pressure pump may be fluidly coupled to a check valve 316, represented by the standard ball and spring symbol, by fuel line 318. Check valve 316 allows fuel to travel downstream, under some conditions, and impedes fuel from traveling upstream when there is a sufficient pressure differential. In another example, other suitable valves may be used that can impede fluid from traveling upstream into the fuel tank. Check valve 316 may be fluidly coupled to a fuel filter 320 by a fuel line 322. The fuel filter may remove unwanted particles from the fuel in the fuel line. A fuel pressure regulator 324 may be coupled to fuel line 325.

The fuel line 325 may extend out of the fuel tank fluidly coupling the fuel filter and a fuel pressure accumulator 326. In some examples, the fuel pressure accumulator may be a Freundenberg fuel pressure accumulator. In other examples, the fuel pressure accumulator may be another suitable fuel accumulator that allows a greater amount of fuel to be stored in the fuel delivery system, downstream of the lower pressure pump. Yet in other examples, the fuel pressure accumulator may be removed. A solenoid valve 327 may be fluidly coupled downstream of the fuel pressure accumulator. Solenoid valve 327 may include a check valve 328. Controller 12 may be electronically coupled to solenoid valve 327. In this example, when solenoid valve 327 is unpowered, fluid is allowed to flow freely through the valve. However, when solenoid valve 327 is powered by the controller, check valve 328 is configured to impede fluid from traveling upstream of check valve 328, under some conditions. In other examples, check valve 328 may be configured to impede fluid from traveling upstream of the valve when solenoid valve 327 is unpowered. The solenoid valve may be controlled synchronous to a higher pressure pump's (see below) cam position, to achieve an effective displacement of 0 to 0.25 cc per stroke.

The higher pressure pump 330 may be coupled downstream of the fuel pressure accumulator 326 by a fuel line 332. In this example, the higher pressure fuel pump is mechanically actuated positive displacement pump that includes a piston 334, a cylinder 335, and a cam 336. The higher pressure pump may use mechanical energy, produced by the engine, for actuation. In other examples, the higher pressure pump may be another suitable pump such as an electronically actuated pump.

A check valve 338 may be coupled downstream of the higher pressure pump by fuel line 340. Bypass fuel line 342 may be coupled directly upstream and downstream of check valve 338. The bypass fuel line may contain a pressure relief valve 344. In this example, pressure relief valve 344 is a check valve, represented by the industry standard ball and spring. In other examples, pressure relief valve may be another suitable valve which prevents the pressure downstream of valve 344 from becoming too high and possibly damaging downstream components as well as impeding fuel from traveling upstream under some conditions. In some examples, check valve 338 and bypass fuel line 342 may be referred to as a parallel port pressure relief valve PPRV 346.

A fuel rail 350 may be coupled to the parallel port pressure relief valve 346 by fuel line 348. A pressure sensor 352 may be coupled to the fuel rail. The pressure sensor may be electronically coupled to controller 12. Furthermore, the pressure sensor may measure the pressure of the fuel in the fuel rail. In other examples, the pressure sensor may be coupled to another location in the fuel delivery system downstream of the higher pressure pump. In some examples, a temperature sensor (not shown) may be coupled to the fuel rail. The temperature sensor may measure the temperature of the fuel rail. The fuel rail may be fluidly coupled to a series of fuel injectors 354. The fuel injectors may deliver fuel to the engine 110. Due to aging, fuel contamination, and/or hardware failure, undesired fuel outflow from one or more fuel injectors 354 may occur. Detection of undesired fuel outflow from one or more fuel injectors and mitigating actions that may be performed to prevent undesired evaporative emissions, misfire, engine hydrolock, fuel smell in the vehicle cabin, etc., are described in further detail with regard to the example method depicted in FIG. 7.

Figure 4:
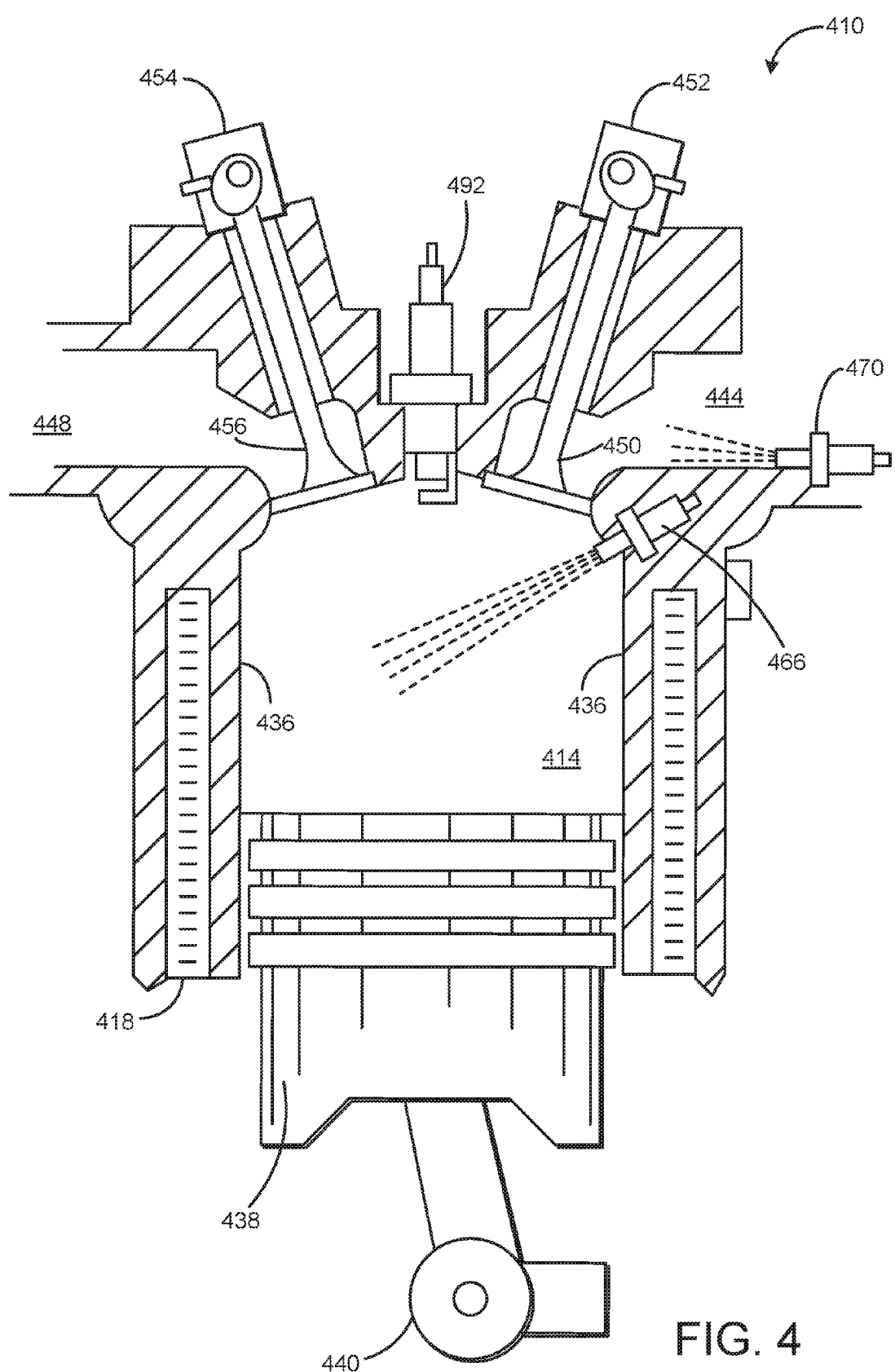
FIG. 4 schematically shows an example combustion cylinder for an engine.

FIG. 4 depicts an example embodiment of a combustion chamber or cylinder that may be included in engine 410, which may be configured similarly to engine 110 as described herein, and depicted in FIG. 1 and/or engine 210, as described herein and depicted in FIG. 2. Cylinder (i.e. combustion chamber) 414 may include combustion chamber walls 436 with piston 438 positioned therein. Piston 438 may be coupled to crankshaft 440 so that reciprocating motion of the piston is translated into rotational motion of the crankshaft. Crankshaft 440 may be coupled to at least one drive wheel of the passenger vehicle via a transmission system. Further, a starter motor may be coupled to crankshaft 440 via a flywheel to enable a starting operation of engine 410, and/or to rotate the engine in an unfueled mode.

Cylinder 414 can receive intake air via intake air passage 444, which may be one of a plurality of intake air passages coupled to cylinder 414. Intake air passage 444 may communicate with other cylinders of engine 410 in addition to cylinder 414. In some embodiments, one or more of the intake passages may include a boosting device such as a turbocharger or a supercharger. Exhaust passage 448 can receive exhaust gases from cylinder 414 as well as from other cylinders of engine 410.

Each cylinder of engine 410 may include one or more intake valves and one or more exhaust valves. For example, cylinder 414 is shown including at least one intake poppet valve 450 and at least one exhaust poppet valve 456 located at an upper region of cylinder 414. In some embodiments, each cylinder of engine 410, including cylinder 414, may include at least two intake poppet valves and at least two exhaust poppet valves located at an upper region of the cylinder.

Intake valve 450 may be controlled by a controller via actuator 452. Similarly, exhaust valve 456 may be controlled by a controller via actuator 454. During some conditions, the controller may vary the signals provided to actuators 452 and 454 to control the opening and closing of the respective intake and exhaust valves. The position of intake valve 450 and exhaust valve 456 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 414 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 414 can have a compression ratio, which is the ratio of volumes when piston 438 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 410 may include a spark plug 492 for initiating combustion. An ignition system (not shown) can provide an ignition spark to cylinder 414 via spark plug 492 in response to a spark advance signal from a controller, under select operating modes. However, in some embodiments, spark plug 492 may be omitted, such as where engine 410 may initiate combustion by auto-ignition or by injection of fuel as may be the case with some diesel engines.

In some embodiments, each cylinder of engine 410 may be configured with one or more fuel injectors for providing fuel thereto. As a non-limiting example, cylinder 414 is shown including two fuel injectors 466 and 470. Fuel injector 466 is shown coupled directly to cylinder 414 for injecting fuel directly therein in proportion to a pulse width of a signal received from a controller via an electronic driver. In this manner, fuel injector 466 provides what is known as direct injection (hereafter referred to as "DI") of fuel into cylinder 414. While FIG. 4 shows injector 466 as a side injector, it may also be located overhead of the piston, such as near the position of spark plug 492. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 466 from a high pressure fuel system including a fuel tank, fuel pumps, a fuel rail, etc., as depicted with regard to FIG. 2 and FIG. 3. Alternatively, fuel may be delivered by a single stage fuel pump at lower pressure, in which case the timing of the direct fuel injection may be more limited during the compression stroke than if a high pressure fuel system is used.

Fuel injector 470 is shown arranged in intake air passage 444, rather than in cylinder 414, in a configuration that provides what is known as port injection of fuel (hereafter referred to as "PFI") into the intake port upstream of cylinder 414. Fuel injector 470 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 414. Further, the distribution and/or relative amount of fuel delivered from each injector may vary with operating conditions such as described herein below. The relative distribution of the total injected fuel among injectors 466 and 470 may be referred to as a first injection ratio. For example, injecting a larger amount of the fuel for a combustion event via (port) injector 470 may be an example of a higher first ratio of port to direct injection, while injecting a larger amount of the fuel for a combustion event via (direct) injector 466 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 4 shows only one cylinder of a multi-cylinder engine. As such each cylinder may similarly include its own set of intake/exhaust valves, fuel injector(s), spark plug, etc.

Fuel injectors 466 and 470 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 470 and 466, different effects may be achieved. Fuel injectors 466 and 470 may be configured to inject fuel from the same fuel tank, from different fuel tanks, from a plurality of the same fuel tanks, or from an overlapping set of fuel tanks.

For PHEVs, the fuel vapor canister primarily adsorbs refueling vapors, as refueling and diurnal vapors are sealed within the fuel tank by the FTIV (e.g., 252). The AIS HC trap may adsorb fuel vapors emanating from unburned fuel in the intake manifold, puddled fuel from one or more fuel injectors with undesired fuel outflow, and/or fuel vapors in crankcase ventilation emissions during engine-off periods. However, depending on the position of the cylinder intake and exhaust valves when the engine is shut off, uncombusted fuel vapors may migrate to either the engine intake or the exhaust manifold and may then escape to atmosphere. This may cause a vehicle to exceed regulated evaporative emissions. The inventors herein have recognized that the ELCM vacuum pump may be used to draw uncombusted fuel vapors from fuel injectors with undesired fuel outflow into the fuel vapor canister, thus decreasing the potential for these hydrocarbons to be emitted to atmosphere.

For PHEVs and other vehicles which couple the engine drive train to an electric motor that can be powered by a battery (e.g., other HEVs), the engine may be spun unfueled and at a low speed using the electric motor. This action may also generate heat, which may cause liquid fuel within the cylinders to vaporize. The fuel vapor may then be adsorbed into the fuel vapor canister. The engine may be stopped with a first cylinder positioned with the intake valve open. For example, FIG. 5A shows cylinder 414 in a configuration with intake valve 450 open, and thus the combustion chamber is coupled to intake air passage 444. In this conformation, the CPV may be opened and the throttle may be closed, thus coupling the engine intake to the fuel vapor canister, and the ELCM vacuum pump may be turned on, drawing a vacuum on cylinder 414. In this way, responsive to an indication of one or more fuel injectors with undesired fuel outflow, at an engine-off event, vacuum may be drawn on the respective cylinders in order to route fuel vapors to the fuel vapor canister for storage, thereby decreasing the potential for evaporative emissions. For example, in a case where undesired fuel outflow from multiple fuel injectors are indicated, after one cylinder is purged, the engine may be spun unfueled again and stopped so that another indicated cylinder is positioned with the intake valve open. The process may be repeated until all indicated cylinders are purged.

For vehicles that are configured with dual independent variable cam timing systems, or other means of independently controlling both the intake valve and exhaust valve, the engine may be stopped in a position where both the intake valve and the exhaust valve are open simultaneously. This conformation is shown in FIG. 5B, where both intake valve 450 and exhaust valve 456 are open. In this way, exhaust passage 448 is coupled to intake air passage 444 via cylinder 414. With the CPV open, the ELCM vacuum pump may then be used to draw a vacuum on the exhaust manifold and exhaust passage, thus evacuating any residual exhaust or uncombusted fuel vapor to the fuel vapor canister.

In some examples, the vehicle may include an exhaust gas recirculation (EGR) system including an active EGR valve. For vehicles that do not include dual independent VCT systems, this may provide an alternative means for coupling the exhaust manifold to the ELCM vacuum pump so that exhaust gas and/or uncombusted hydrocarbons trapped within the exhaust manifold and exhaust line may be drawn into the fuel vapor canister. FIG. 6 shows a schematic depiction of a vehicle system 606. The vehicle system 606 includes an engine system 608 coupled to an emissions control system 651 and a fuel system 618. In some examples, vehicle system 606 may be a hybrid electric vehicle system.

Similarly to engine system 208 described herein and depicted in FIG. 2, engine system 608 may include an engine 610 having a plurality of cylinders 230. The engine 610 includes an engine intake 623 and an engine exhaust 625. The engine intake 623 includes a throttle 262 fluidly coupled to the engine intake manifold 244 via an intake passage 242. The engine exhaust 625 includes an exhaust manifold 248 leading to an exhaust passage 235 that routes exhaust gas to the atmosphere. The engine exhaust 625 may include one or more emission control devices 270, which may be mounted in a close-coupled position in the exhaust.

Engine system 608 may also include an exhaust gas recirculation (EGR) system 630 that receives a portion of an exhaust gas stream exiting engine 610 and returns the exhaust gas to engine intake manifold 244 downstream of throttle 262. Under some conditions, EGR system 630 may be used to regulate the temperature and or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 630 is shown forming a common EGR passage 632 from exhaust passage 235 to intake passage 242.

In some examples, exhaust system 625 may also include a turbocharger (not shown) comprising a turbine and a compressor coupled on a common shaft. The turbine may be coupled within exhaust passage 235, while the compressor may be coupled within intake passage 242. The blades of the turbine may be caused to rotate about the common shaft as a portion of the exhaust gas stream discharged from engine 610 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 610. In systems where EGR passage 632 is coupled to engine exhaust 625 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 634 may be coupled within EGR passage 632. EGR valve 634 may be configured as an active solenoid valve that may be actuated to allow exhaust gas flow into intake manifold 244. The portion of the exhaust gas flow discharged by engine 610 that is allowed to pass through EGR system 630 and returned to engine 610 may be metered by the measured actuation of EGR valve 634 which may be controlled by a controller. The actuation of EGR valve 634 may be based on various vehicle operating parameters and a calculated overall EGR flow rate.

One or more EGR coolers 636 may be coupled within EGR passage 632. EGR cooler 636 may act to lower the overall temperature of the EGR flow stream before passing the stream on to air intake manifold 244 via where it may be combined with fresh air and directed to engine 610. EGR passage 632 may include one or more flow restriction regions 638. One or more pressure sensors 639 may be coupled at or near flow restriction region 638. The diameter of the flow restriction region may thus be used to determine an overall volumetric flow rate through EGR passage 632.

To evacuate engine exhaust 625, EGR valve 634 may be commanded open while CPV 261 is open, throttle 262 is closed, and ELCM 295 is drawing a vacuum on canister 222. In this way, exhaust within exhaust manifold 248, exhaust passage 235, and EGR passage 632 may be drawn through EGR valve 634, enter purge line 228, traverse CPV 261, and enter fuel vapor canister 222.

Turning to FIG. 7, a flow chart for an example method 700 for performing mitigating actions in response to an indication of undesired fuel injector fuel outflow, is shown. More specifically, method 700 may be used to, responsive to an indication of undesired outflow of fuel from one or more fuel injector(s) and upon an indication of an engine-off condition, evacuate fuel vapors resulting from the undesired fuel outflow to a fuel vapor canister for storage. Evacuating the vapors from the undesired fuel outflow to the fuel vapor canister may comprise positioning an intake valve in an open conformation, and an exhaust valve in a closed conformation on a cylinder corresponding to the indicated fuel injector with undesired fuel outflow, and activating a pump to draw fuel vapors into the fuel vapor canister. In this way, method 700 may prevent issues that may result from undesired outflow of fuel from a fuel injector, such as hesitation/stumbles, engine hydrolock, and increased emissions at the next engine startup. Furthermore, for a vehicle such as a PHEV that can be driven solely by battery power, a fuel rail is still primed at every key on event. Thus, if undesired fuel outflow from a fuel injector is present and if the respective cylinder is parked in a conformation wherein the exhaust valve is open, hydrocarbons may escape to the atmosphere, thereby increasing emissions. By evacuating the respective cylinder under such circumstances, emissions may be reduced. Method 700 will be described with reference to the systems described herein and as shown in FIGS. 1-6, though it should be understood that similar methods may be applied to other systems without departing from the scope of this disclosure. Method 700 may be carried out by a controller holding executable instructions in non-transitory memory, such as controller 212 in FIG. 2. The controller may employ engine actuators of the engine system to adjust engine operation, according to the method described below. It should be understood that method 700 may be applied to other systems of a different configuration without departing from the scope of this disclosure.

Method 700 begins at 705 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 includes determining whether undesired fuel injector outflow is indicated. Numerous strategies may be utilized in order to determine the presence of undesired fuel outflow from one or more fuel injectors, of which a select few examples will be described in further detail below. However, it should be understood that the following examples are meant to be informative, and in no way limiting, with regard to the subject matter presented herein. As such, other variations and methodologies not specified herein with regard to the detection of undesired outflow of fuel from one or more fuel injectors in a vehicle may be readily applied to the concepts described herein, without departing from the scope of the present disclosure.

Briefly, 710 may include monitoring a change in fuel rail pressure at a start of an injection event. For example, an amount of decrease in fuel rail pressure during start of injection may be monitored (e.g., by utilizing pressure sensor 352). In response to the amount of decrease less than a threshold amount, it may be determined that the injector was already open prior to the command to open, and accordingly, undesired fuel outflow from the monitored fuel injector may be indicated.

In another example, performing fuel injector diagnosis may include monitoring a change in rail pressure over a period of time during a deceleration fuel shutoff (DFSO) operation. For example, during DFSO, fuel is shut-off to all cylinders. If undesired outflow from one or more fuel injectors is not present, then the change in fuel rail pressure may be less than a predetermined threshold change. However, if undesired outflow from one or more fuel injectors is present, then the change in fuel rail pressure may reach the predetermined threshold pressure change or may be greater than the predetermined threshold change. Similarly, a change in fuel rail pressure greater than or equal to a predetermined threshold change during a condition wherein a vehicle operating in battery only mode (e.g., PHEV), or other engine off event (e.g., key off, idle-stop), may indicate undesired fuel outflow from one or more fuel injectors.

In still another example, performing fuel injector diagnosis may include monitoring an increase in crankshaft acceleration and/or gas torque output during a DFSO condition. For example, during DFSO operation, while fuel is shut-off to all the cylinders, intake/exhaust valves may continue to operate. Consequently, air may be moved through the cylinder. Further, during DFSO, spark may be disabled in order to increase a life span of a spark plug providing the spark. However, during fuel injector diagnosis, spark may be provided for a given cylinder so that if there is undesired fuel outflow from a specific fuel injector, an air/fuel mixture may be present in the cylinder and consequently, the spark may trigger a combustion event. Consequently, crankshaft acceleration may increase and engine torque output may increase. Therefore, during DFSO, in response to crankshaft acceleration greater than a threshold acceleration and/or an increase in engine torque output greater than a threshold increase, undesired fuel outflow from a specific fuel injector may be detected. In this way, undesired fuel outflow from a specific fuel injector may be diagnosed by monitoring crankshaft acceleration and/or torque output during DFSO. Further, the diagnosis may be performed until all injectors are evaluated for undesired fuel outflow. For example, fuel injector diagnosis may be performed for a first injector by providing spark to a first cylinder (and not providing spark to the remaining cylinders) for a predetermined number of cylinder cycles and monitoring for changes in crankshaft acceleration and/or torque output; subsequently a second injector may be tested by providing spark to a second cylinder (and not providing spark to the remaining cylinders) for the predetermined number of cylinder cycles and monitoring the resulting changes in crankshaft acceleration and/or torque output, and so on until all the cylinders are tested.

At 710, if undesired fuel injector outflow is not indicated, method 700 proceeds to 715. At 715, method 700 may include maintaining the status of the engine, exhaust, and emissions control systems. For example, as undesired fuel injector outflow is not indicated, if the engine is in operation no corrective measures may be undertaken to lean out a rich air/fuel ratio. In other examples, if the engine is off or upon engine shut-down, actuators such as the throttle (e.g., 262) and canister purge valve (e.g., 261), engine intake and exhaust valves, and ELCM pump (e.g., 295) may be maintained in their current state. Method 700 may then end.

Returning to 710, if undesired fuel injector outflow is indicated, method 700 proceeds to 720 and includes indicating whether an engine-off event is detected. An engine-off event may include a key-off event, a transition from engine operation to vehicle operation powered solely by battery power, or an engine-off event comprising an idle stop (e.g., start-stop vehicle). If at 720 an engine-off event is not detected, method 700 proceeds to 725 and includes adjusting the air/fuel ratio to maintain a desired air/fuel ratio stoichiometry while the engine is in drive mode. For example, air/fuel ratio may be monitored by an exhaust gas sensor, such as exhaust gas sensor 237. As described above, exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), etc. In one example, upon detecting a rich air/fuel ratio, controller (e.g., 212) may reduce the amount of fuel injected by the fuel injector(s) in order to maintain desired air/fuel ratio.

Returning to 720, if an engine-off event is indicated, method 700 proceeds to 728. At 728, method 700 includes determining whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has been requested, method 700 proceeds to 735 and includes aborting method 700 and proceeding with a refueling operation. For example, the method may be aborted and the controller 212 may open a fuel tank isolation valve (such as FTIV 252) and open or maintain open a vent path between the fuel vapor canister and atmosphere (e.g., open CVV), while maintaining a canister purge valve (e.g., CPV 261) closed, to depressurize the fuel tank before allowing enabling fuel to be added therein. The fuel tank isolation valve may be opened in a manner to depressurize the fuel tank at a predetermined rate, so as to prevent rapid depressurization (e.g., FLVV and GVV, which may cork shut due to rapid depressurization). A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gases stripped of refueling vapors to be flowed to atmosphere.

Returning to 728, if a request for refueling is not indicated, method 700 proceeds to 730. At 730, method 700 includes determining whether a canister load is greater than a threshold. The canister load may be stored at controller 212 (FIG. 2), and may be determined based on quantities of refueling vapor adsorbed by the canister, and quantities of hydrocarbons that have been desorbed from the canister during purge events. The canister load threshold may additionally be based on an amount of uncombusted fuel and exhaust gas expected to be remaining within the engine and exhaust system. As described, a temperature sensor (e.g. 232) coupled to the fuel vapor canister near the vent line (e.g., 227) may be used to monitor temperature changes within the canister during loading and purging events, and as such may be used to determine fuel vapor canister load. The canister load may additionally or alternatively be determined based on fuel tank pressure prior to and during refueling events, readings from hydrocarbon sensors and/or oxygen sensors, etc. If the canister load is relatively high, (e.g., no purge event has occurred since a recent refueling event) the canister may not be able to store additional hydrocarbons. As such, if the canister load is above a predetermined threshold, method 700 may proceed to 735. At 735, method 700 may include aborting the method. In one example, if the engine-off event comprised a key-off event, aborting the method at 735 may include sleeping the controller. In other examples, such as an engine-off event comprising the vehicle transitioning from engine operation to vehicle operation powered solely by battery power, or an engine-off event comprising an idle stop (e.g., start-stop vehicle), the controller may remain on, and the method aborted. Method 700 may then end.

Returning to 730, if it is determined that canister load is not greater than a threshold, method 700 proceeds to 740. At 740, method 700 includes spinning the engine unfueled. For example, an electric motor, such as a starter motor or a hybrid electric vehicle direct current (DC) motor may be operated (activated) to spin the engine. The controller may be configured to disable spark and fuel injection. The throttle may be placed or maintained in a partially open position to prevent an intake vacuum from developing. The engine may be spun unfueled for a predetermined duration, or for a duration based on current operating conditions. For example, the engine may be spun unfueled until it reaches a pre-determined temperature, such as a temperature where liquid fuel trapped within an engine cylinder is likely to be vaporized. The engine may be spun at a relatively low speed, for example at idling speed or lower, but may be spun at a higher speed if more heat generation is necessary (e.g., ambient temperatures are below a threshold). In other examples, the engine may be spun unfueled only for a duration wherein an intake valve on a selected cylinder may be positioned in an open conformation and an exhaust valve on the selected cylinder may be positioned in a closed conformation, at which point the spinning of the engine unfueled may be stopped.

Continuing at 745, method 700 includes stopping (deactivating) the engine spinning at a point wherein a cylinder receiving fuel from an indicated fuel injector with undesired fuel outflow may be positioned with an intake valve opened and an exhaust valve closed. For example, FIG. 5A shows cylinder 414 in a position with intake valve 450 opened and exhaust valve 456 closed. Engines with mechanically activated valves may require the engine to be stopped in a specific position to open the intake valve for the first cylinder, whereas in another embodiment, engines with electrically activated valves may be able to open an intake valve from a plurality of engine positions. In some examples, more than one cylinder may be positioned with an open intake valve and a closed exhaust valve, if undesired fuel outflow from more than one fuel injector is indicated.

Proceeding to 750, method 700 includes closing the throttle (e.g., 262) and commanding open the canister purge valve (e.g., 261). In addition a fuel tank isolation valve (e.g., 252) may be maintained in a closed conformation. By closing the throttle and commanding open the canister purge valve while maintaining close the fuel tank isolation valve, a fluid path may be established coupling the intake manifold (e.g., 244) to the fuel vapor canister (e.g., 222).

At 755, method 700 includes purging the cylinder receiving fuel from the indicated fuel injector with undesired fuel outflow, to the fuel vapor canister. For example, the ELCM vacuum pump (e.g., 295) may be placed in a conformation to draw vacuum on engine intake, which may include placing a changeover valve in position to couple fuel vapor canister 222 to atmosphere via the ELCM vacuum pump, and opening (or maintaining open) CVV 297. In this way, vaporized, uncombusted fuel may be drawn out of the indicated cylinder and drawn into the fuel vapor canister to be adsorbed. Additionally, by drawing vacuum on engine intake, any hydrocarbons adsorbed by AIS hydrocarbon trap 224 may be desorbed and drawn in to the fuel vapor canister. During the purging operation, a canister temperature sensor 232 may be used to monitor canister loading state. If at any point during the purging of the indicated cylinder, it is indicated that the canister load has reached a threshold (e.g., saturated canister), then the method may proceed to 770 wherein the method may be discontinued. Monitoring canister load may include monitoring a temperature of the fuel vapor canister at a position near the vent line (e.g., 227). A temperature increase above a threshold may indicate a saturated fuel vapor canister, at which point the method may be discontinued. For example at 770, method 700 includes stopping the ELCM pump and returning cylinders and actuators to default conformation for engine-startup. For example, the ELCM pump may be commanded off, the throttle returned to default conformation, the canister purge valve commanded closed. In some examples the canister vent valve may be commanded closed. However, in other examples, the canister vent valve may be maintained open.

Proceeding to 775, method 700 includes updating the canister load and canister purge schedule. For example, the controller may update the canister load to reflect the quantity of hydrocarbons adsorbed during the purging operation, and the canister purge schedule may be updated based on the updated canister load. Method 700 may then end.

If canister load remains below a threshold, method 700 proceeds to 760 and includes indicating whether a fuel rail pressure is less than a threshold, wherein fuel rail pressure is indicated by a fuel rail pressure sensor (e.g., 352). For example, the fuel rail (e.g., 350) may contain pressurized fuel. Responsive to an engine-off event as described in further detail above with regard to step 720 of method 700, undesired outflow of fuel from one or more fuel injector(s) may result in a decrease in fuel rail pressure as fuel in the fuel rail is deposited into the respective cylinder(s). Depending on the rate at which undesired fuel outflow from the one or more fuel injector(s) occurs, the duration of time it may take for the fuel rail pressure to decrease to a threshold (e.g., atmospheric pressure), may vary. When the fuel rail pressure reaches the threshold (e.g., atmospheric pressure), it may be understood that fuel in the fuel rail has been depleted, and the hydrocarbons routed to the fuel vapor canister to be adsorbed. As such, at 760, if it is indicated that fuel rail pressure has not reached the threshold, method 700 proceeds to 764. At 764, method 700 includes indicating whether an engine on event is requested. In one example, an engine-on request may include the release of an engine automatic stop request, in the case of a vehicle start-stop system designed to automatically shut down when the vehicle is at rest, such as at a traffic light. In such an example, the release of the engine automatic stop request may include the driver releasing the brake pedal, operating a shift lever in preparation to restart the vehicle, or depressing an accelerator pedal. In another example, the engine restart request may be initiated by a transition from an electric mode of vehicle operation to an engine-on mode of operation. If at 764 an engine-on event is not indicated to be requested, method 700 returns to 755 and includes continuing to purge the indicated cylinder to the fuel vapor canister as described above. Alternatively, if at 764, an engine-on event request is indicated, then method 700 proceeds to 770 and includes stopping the ELCM pump and returning cylinders and actuators to default conformation for engine-startup. As described above, the ELCM pump may be commanded off, the throttle returned to default conformation, the canister purge valve commanded closed. The canister vent valve may be commanded closed, or may be maintained open.

Proceeding to 775, method 700 includes updating the canister load and canister purge schedule. The controller may update the canister load to reflect the quantity of hydrocarbons adsorbed during the purging operation, and the canister purge schedule may be updated based on the updated canister load. Method 700 may then end.

Returning to 760, if it is indicated that fuel rail pressure is less than the threshold, method 700 proceeds to 765. At 765, method 700 may include purging the exhaust system to the fuel vapor canister. For example, as described above, an indication of fuel rail pressure less than a threshold may indicate that fuel in the rail has been depleted. To further ensure that any unburnt hydrocarbons that may have migrated to the exhaust system are not released to the atmosphere, the exhaust system may be purged in similar fashion as described above. As described herein and depicted in FIG. 5B, for engines configured with dual independent variable cam timing, one or more engine cylinders may be placed in a conformation with both the intake valve open and the exhaust valve open, thus coupling the exhaust system to intake. In other examples, for engines configured with an EGR system, as shown in FIG. 6, the cylinder valves may be maintained in a default conformation, while the EGR valve (e.g., 634) is opened, thereby coupling the engine intake to exhaust. In either case, similar to cylinder purging, the throttle, CPV, and ELCM may be placed in purge conformation, and the ELCM vacuum pump turned on. The purge conformation may be maintained for a duration, during which time period the canister temperature sensor (e.g., 232) may be used to monitor canister loading state and, if at any point during the purging of the exhaust system it is indicated that the canister load has reached the threshold (e.g., saturated canister), then the method may proceed to 770. If canister load does not reach the threshold, in one example method 700 may proceed to 770 responsive to an indication that the fuel vapor canister is no longer adsorbing hydrocarbons. A fuel vapor canister that is no longer adsorbing hydrocarbons may be indicated by a plateau of the fuel vapor canister temperature below a threshold temperature that would indicate saturation. Additionally, if at 765 an engine on request is indicated, as described in detail with regard to step 764, method 700 may additionally proceed to 770.

At 770, as described above, method 700 includes stopping the ELCM pump and returning cylinders and actuators to default conformation for engine startup. For example, the ELCM pump may be commanded off, the throttle returned to default conformation, and the canister purge valve commanded closed. If purging the exhaust system at 765 involved commanding open the EGR valve, at 770 the EGR valve may be commanded closed. In some examples the canister vent valve may be commanded closed, or alternatively the canister vent valve may be maintained open.

Proceeding to 775, method 700 includes updating the canister load and canister purge schedule. For example, the controller may update the canister load to reflect the quantity of hydrocarbons adsorbed during the purging operation, and the canister purge schedule may be updated based on the updated canister load. Method 700 may then end.

FIG. 8 shows an example timeline 800 for reducing evaporative emissions by performing mitigating actions upon indication of undesired fuel outflow from one or more fuel injectors according to the methods described herein and with reference to FIG. 7, and as applied to the systems described herein and with reference to FIGS. 1-6. Timeline 800 includes plot 805, indicating whether undesired fuel outflow from one or more fuel injectors is detected over time. Timeline 800 further includes plot 810, indicating whether an engine-off condition is detected, over time. Timeline 800 further includes plot 815, indicating fuel rail pressure, over time. Line 816 represents a threshold fuel rail pressure (e.g., atmospheric pressure), wherein the fuel rail may be depleted of fuel. Timeline 800 further includes plot 820, indicating the open or closed state of an intake valve of a cylinder indicated to be receiving undesired fuel outflow from a fuel injector, and plot 825, indicating the open or closed state of an exhaust valve of the cylinder indicated to be receiving undesired fuel outflow from the fuel injector, over time. Timeline 800 further includes plot 830, indicating the position of a throttle, and plot 835, indicating the open or closed state of a canister purge valve, over time. Timeline 800 further includes plot 840, indicating a canister load, over time. Line 841 represents a threshold canister load, wherein the canister is saturated with hydrocarbons and is therefore unable to adsorb any further additional hydrocarbons. Timeline 800 further includes plot 845, representing the status of an onboard pump (e.g., ELCM 295), and plot 850, representing the status of an onboard electric motor (e.g. electric starter motor or hybrid electric vehicle DC motor), over time.

At time $t_0$, the vehicle is in operation and the engine is on, as indicated by plot 810. Additionally, undesired outflow of fuel from a fuel injector has been detected, as indicated by plot 805. In this example timeline, it is assumed that undesired fuel outflow has been detected from only one fuel injector. However, it should be understood that in some examples, undesired outflow of fuel may be indicated for a plurality of fuel injectors without departing from the scope of the present disclosure. As described above, indicating undesired outflow from one or more fuel injectors may be accomplished by a variety of methods. In one example, a change in fuel rail pressure less than a threshold during the start of fuel injection may indicate a fuel injector with undesired fuel outflow. In other examples, during engine-off conditions, a fuel rail pressure change greater than a threshold may indicate undesired fuel outflow from one or more fuel injectors. In still other examples, monitoring crankshaft acceleration and/or gas torque output during a DFSO condition may be used to indicate undesired fuel outflow from one or more fuel injectors, as described in further detail above.

Continuing on, at time $t_0$ pressure in the fuel rail, as indicated by a fuel rail pressure sensor (e.g., 352), is high, indicated by plot 815, responsive to the engine being in operation. Throttle position, adjusted according to engine operating conditions, is substantially open, indicated by plot 830. The canister purge valve (e.g., 261) is in a closed conformation indicated by plot 835, and thus a canister purge operation is not being conducted. Canister load, indicated by plot 840 is low, thus indicating that the fuel vapor canister is substantially free of adsorbed hydrocarbons. As the engine is in operation, the ELCM pump (e.g., 295) is off, indicated by plot 845, and the electric motor (e.g., starter motor or HEV DC motor) is off, indicated by plot 850.

Between time $t_0$ and $t_1$ as the engine is in operation, the intake valve of the cylinder that receives fuel from the fuel injector from which undesired fuel outflow is indicated, opens and closes, indicated by plot 820, as does the exhaust valve of the same cylinder, indicated by plot 825. As the engine is in operation, fuel rail pressure remains high. Throttle position changes to a more closed conformation, based on engine load. At time $t_1$, the engine is shut off, indicated by plot 810. In one example, the engine may be shut off responsive to a key off event. In another example, the engine may be turned off responsive to the vehicle stopping, for example at a traffic light. In still other examples, the engine may be shut off based on the vehicle transitioning from hybrid operation, to vehicle operation powered solely by battery power. In the example timeline 800 depicted herein, it may be assumed that the engine shutoff may be due to a vehicle transitioning from a mode of operation wherein the engine is on (e.g., energy efficient driving using the engine as the main power source), to a mode of operation wherein the engine is off (e.g., low speed driving using the battery as the only power source).

Between time $t_1$ and $t_2$ fuel pressure in the fuel rail slightly decreases, the result of the indicated undesired fuel outflow from a fuel injector as described above. At time $t_2$ the electric motor is activated to spin the engine unfueled in order to position the intake valve of the indicated cylinder in an open conformation. As discussed above, in some circumstances the engine may be spun unfueled for a predetermined duration, for a duration based on current operating conditions, or for a duration until a predetermined temperature is indicated. For example, in a circumstance wherein undesired fuel outflow from one or more fuel injectors is indicated and a key-on event is initiated wherein the fuel rail is primed with fuel yet the vehicle is operating in battery-only mode, spinning the engine unfueled until a predetermined temperature is reached may serve to ensure that liquid fuel in the indicated cylinder(s) receiving fuel from the one or more indicated fuel injectors is likely to be vaporized wherein it may be routed to the fuel vapor canister. In the example depicted herein with regard to timeline 800, the engine was in operation until shutdown at time $t_1$, thus it may be assumed that the engine temperature is above a threshold temperature wherein fuel in the indicated cylinder may be readily vaporized. As such, between time $t_2$ and $t_3$, the electric motor is activated and the engine spun unfueled only for a duration wherein the intake valve on the indicated cylinder may be positioned in an open conformation and the exhaust valve on the indicated cylinder may be positioned in a closed conformation, at which point the spinning of the engine unfueled may be stopped.

At time $t_3$ subsequent to positioning the indicated cylinder with the intake valve in an open conformation and the exhaust valve in a closed conformation, the electric motor is deactivated, the throttle is commanded closed, the canister purge valve is commanded open, and the ELCM pump is activated to evacuate the intake manifold. As described above, if included the canister vent valve (not shown) may additionally be commanded open or maintained open and the fuel tank isolation valve (not shown) may additionally be maintained closed or, if open, commanded closed.

Between time $t_3$ and $t_4$ with the ELCM pump activated, fuel vapors are routed from the intake manifold including the indicated cylinder receiving fuel from the fuel injector with undesired fuel outflow, to the fuel vapor canister to be adsorbed. As such canister load, indicated by plot 840, steadily rises, as monitored for example, by a temperature sensor (e.g., 232). However, between time $t_3$ and $t_4$ a threshold canister load is not reached, represented by line 841, thus the ELCM pump is maintained on throughout the time period. As undesired fuel outflow from the indicated fuel injector is occurring, fuel rail pressure steadily decreases, as indicated by plot 815.

At time $t_4$ fuel rail pressure reaches a threshold (e.g., atmospheric pressure), represented by line 816. As such, it may be appreciated that fuel in the fuel rail has become depleted, with all of the fuel in the fuel rail flowing into the indicated cylinder wherein the fuel vapors are directed to the fuel vapor canister by means of the ELCM pump. As the fuel rail has become depleted of fuel and the engine-off condition is still maintained, at $t_4$ the electric motor is again activated in order to place the exhaust valve of the indicated cylinder in an open conformation. Accordingly, between time $t_4$ and $t_5$ the electric motor turns the engine such that the exhaust valve is opened at time $t_5$, in addition to the intake valve being maintained open. As such, it may be appreciated that the vehicle depicted in the example timeline 800 is configured with dual independent variable cam timing systems, such that the engine may be stopped in a position where both the intake valve and the exhaust valve are open simultaneously. In other examples, as described in detail above, to purge the exhaust system of residual hydrocarbons, an EGR valve (e.g., 634) may be commanded open in order to couple the exhaust passage to the intake air passage. However in the example timeline 800 depicted herein, by stopping the engine in a position where both the intake valve and the exhaust valve are open simultaneously, exhaust passage (e.g., 448) is coupled to intake air passage (e.g., 444) via the indicated cylinder, as shown in the example illustration depicted in FIG. 5B.

At time $t_5$, with the intake and exhaust valves on the indicated cylinder each positioned in an open conformation, the electric motor is deactivated and the ELCM pump maintained on. Additionally, the throttle is maintained closed and the canister purge valve is maintained open. As such, between time $t_5$ and $t_6$ vacuum is applied to the exhaust manifold such that any residual hydrocarbons in the exhaust manifold are routed to the fuel vapor canister, thus preventing the escape of hydrocarbons in the exhaust manifold to atmosphere. Accordingly, between time $t_5$ and $t_6$, fuel vapor canister load, as monitored by the fuel vapor canister temperature sensor (e.g., 232) increases slightly and then is observed to plateau. As the fuel vapor canister load is indicated to plateau, it may be appreciated that the exhaust manifold is free of residual hydrocarbons. As such, at time $t_6$ the ELCM pump is deactivated, the canister purge valve is commanded closed, and the throttle is commanded to a default engine-off state. Furthermore, the electric motor is activated and between time $t_6$ and $t_7$ the intake valve and exhaust valve of the cylinder indicated to receive fuel from the fuel injector with undesired fuel outflow, are both returned to a closed conformation. Between time $t_7$ and $t_8$ the status of the engine and evaporative emissions control system actuators are maintained.

In this way, responsive to an indication of undesired fuel outflow from one or more fuel injectors, mitigating action may be undertaken to prevent the release of fuel vapors to the environment during engine-off conditions. Additionally, by directing undesired fuel outflow from one or more fuel injectors to a fuel vapor canister during engine-off conditions, hesitations/stumbles of the engine and/or engine hydrolock at the next engine startup may be prevented. The technical effect of mitigating undesired fuel outflow from one or more fuel injectors using the method described herein is to enable the rapid sequestration of undesired fuel outflow from one or more fuel injectors upon an engine-off event, by positioning the one or more fuel injectors with an intake valve open and an exhaust valve closed, and applying a vacuum to the one or more cylinders such that vapors from the undesired fuel outflow are routed to an onboard fuel vapor canister for storage.

The systems described herein and with reference to FIGS. 1-6B, along with the methods described herein and with reference to FIG. 7, may enable one or more systems and one or more methods. In one example, a method comprises monitoring a fuel injector that supplies fuel to an engine cylinder having intake and exhaust valves; and following an engine-off event and responsive to an undesired fuel outflow from the fuel injector: positioning the intake valve and the exhaust valves to respective open and closed positions; coupling the cylinder to a fuel vapor storage canister; and purging fuel vapors from the undesired fuel outflow through the intake valve to the canister. In a first example of the method, the method includes propelling a vehicle by either a combustion engine or an electric motor; and wherein following an engine-off event, positioning the intake valve and the exhaust valve to respective open and closed positions includes spinning the combustion engine unfueled with the electric motor until the intake valve is open and the exhaust valve is closed. A second example of the method optionally includes the first example and further comprises selectively coupling an intake manifold of the combustion engine to atmosphere via a throttle; selectively coupling the intake manifold of the combustion engine to the fuel vapor storage canister via a canister purge valve coupled within a purge line; selectively coupling the fuel vapor storage canister to atmosphere via a canister vent valve coupled within a vent line; selectively coupling a fuel tank to the fuel vapor storage canister via a fuel tank isolation valve; and wherein coupling the cylinder to a fuel vapor storage canister includes closing the throttle, closing the fuel tank isolation valve, opening the canister purge valve, and opening the canister vent valve. A third example of the method optionally includes any one or more or each of the first and second examples and further includes wherein a pump is positioned within the vent line, and wherein purging fuel vapors from the undesired fuel outflow includes activating the pump to apply vacuum on the cylinder that receives fuel from the fuel injector with undesired fuel outflow. A fourth example of the method optionally includes any one or more or each of the first through third examples and further comprises supplying pressurized fuel to a fuel rail fluidly coupled to a plurality of fuel injectors; monitoring pressure in the fuel rail via a pressure sensor configured to indicate a fuel rail pressure; and wherein monitoring a fuel injector includes indicating a fuel rail pressure decrease greater than a predetermined threshold, the fuel rail pressure decrease greater than the predetermined threshold indicating a fuel injector with undesired fuel outflow. A fifth example of the method optionally includes any one or more or each of the first through fourth examples and further comprises during purging fuel vapors from the undesired fuel outflow to the fuel vapor storage canister; monitoring the fuel rail pressure; and responsive to the fuel rail pressure reaching a second threshold: coupling an exhaust manifold of the combustion engine to the fuel vapor storage canister; and activating the pump to purge fuel vapors in exhaust manifold to the fuel vapor storage canister. A sixth example of the method optionally includes any one or more or each of the first through fifth examples and further includes wherein coupling the exhaust manifold of the combustion engine to the fuel vapor canister includes positioning the cylinder with the intake valve and exhaust valve open by spinning the combustion engine unfueled. A seventh example of the method optionally includes any one or more or each of the first through sixth examples and further comprises selectively coupling an exhaust manifold to an intake manifold of the combustion engine via an exhaust gas recirculation valve coupled within an exhaust gas recirculation passage; and wherein coupling the exhaust manifold of the combustion engine to the fuel vapor storage canister includes commanding open the exhaust gas recirculation valve. An eighth example of the method optionally includes any one or more or each of the first through seventh examples and further comprises during purging fuel vapors from the cylinder that receives fuel from the fuel injector with undesired fuel outflow and exhaust manifold to the fuel vapor storage canister; monitoring temperature of the fuel vapor storage canister by a temperature sensor positioned within the fuel vapor storage canister near the vent line; and responsive to an indication of a fuel vapor storage canister temperature increase above a threshold: deactivating the pump; closing the canister purge valve; and spinning the combustion engine unfueled to close the intake valve and exhaust valve on the cylinder that receives fuel from the fuel injector with undesired fuel outflow. A ninth example of the method optionally includes any one or more or each of the first through eighth examples and further comprises during purging the exhaust manifold to the fuel vapor storage canister; monitoring temperature of the fuel vapor storage canister by the temperature sensor positioned within the fuel vapor canister near the vent line; and deactivating the pump and closing the canister purge valve responsive to a temperature plateau for a predetermined duration. A tenth example of the method optionally includes any one or more or each of the first through ninth examples and further comprises supplying pressurized fuel to the fuel rail at a key-on event; and spinning the engine unfueled for a duration until a predetermined temperature is reached, the predetermined temperature comprising a temperature where liquid fuel trapped within an engine cylinder is likely to be vaporized.

An example of a vehicle system comprises an engine comprising one or more cylinders, each cylinder comprising an intake valve and an exhaust valve; one or more fuel injectors, each supplying pressurized fuel to the one or more cylinders; a fuel vapor canister coupled to an engine intake manifold via a canister purge valve; a throttle coupled between the engine intake manifold and atmosphere; a vacuum pump coupled between the fuel vapor canister and atmosphere; and a controller configured with instructions stored in non-transitory memory, that when executed cause the controller to: responsive to an indication of undesired fuel outflow from a fuel injector, following an engine-off event, position an engine cylinder receiving fuel from the fuel injector with undesired fuel outflow with the intake valve open and the exhaust valve closed; close the throttle; open the canister purge valve; turn the vacuum pump on; and purge fuel vapors from the engine cylinder to the fuel vapor canister. In a first example, the system further comprises an electric motor coupled to the engine; and wherein the controller is further configured with instructions stored in non-transitory memory, that when executed cause the controller to: position the engine cylinder with the intake valve open and the exhaust valve closed by spinning the engine unfueled with the electric motor. A second example of the system optionally includes the first example and further comprises a temperature sensor coupled within the fuel vapor canister; and wherein the controller is further configured with instructions stored in non-transitory memory, that when executed cause the controller to: during purging fuel vapors from the engine cylinder to the fuel vapor canister; monitor fuel vapor canister temperature; and responsive to a temperature increase above a threshold: deactivate the vacuum pump; close the canister purge valve; and spin the engine unfueled to position the cylinder with intake valves and exhaust valves closed. A third example of the system optionally includes any one or more or each of the first and second examples and further comprises a fuel rail coupled to one or more fuel injectors; a pressure sensor coupled to the fuel rail; and wherein the controller is further configured with instructions stored in non-transitory memory, that when executed cause the controller to: monitor pressure in the fuel rail; and indicate undesired fuel outflow from a fuel injector responsive to a fuel rail pressure decrease greater than a predetermined threshold. A fourth example of the system optionally includes any one or more or each of the first through third examples and further includes wherein the controller is further configured with instructions stored in non-transitory memory, that when executed cause the controller to: during purging fuel vapors from the engine cylinder to the fuel vapor canister; monitor pressure in the fuel rail; and responsive to a fuel rail pressure reaching a second threshold: couple an exhaust manifold of the engine to the fuel vapor canister by spinning the engine unfueled to position the intake valve open and exhaust valve open; activate the vacuum pump to purge fuel vapors from the exhaust manifold to the fuel vapor canister; monitor temperature of the fuel vapor canister by the temperature sensor positioned within the fuel vapor canister; and deactivate the vacuum pump and close the canister purge valve responsive to a temperature plateau for a predetermined duration. A fifth example of the system optionally includes any one or more or each of the first through fourth examples and further comprises an exhaust gas recirculation passage positioned between the intake manifold and the exhaust manifold; an exhaust gas recirculation valve coupled within the exhaust gas recirculation passage; and wherein the controller is further configured with instructions stored in non-transitory memory, that when executed cause the controller to: couple the exhaust manifold of the engine to the fuel vapor canister by commanding open the exhaust gas recirculation valve.

Another example of a method comprises propelling a vehicle by either a combustion engine or an electric motor; monitoring a plurality of fuel injectors that supply pressurized fuel to a plurality of cylinders in the combustion engine; and responsive to an indication of a fuel injector with undesired fuel outflow: in a first condition, including an engine-on condition, adjust an air/fuel ratio to compensate for excess fuel in a cylinder receiving fuel from the fuel injector with undesired fuel outflow; and in a second condition, including an engine-off condition, positioning the cylinder that receives fuel from the fuel injector with undesired fuel outflow with an intake valve open and an exhaust valve closed by spinning the engine unfueled via the electric motor; coupling the cylinder to a fuel vapor canister, the fuel vapor canister configured to store vaporized hydrocarbons; and activating a pump to purge fuel vapors resulting from undesired fuel outflow to the fuel vapor canister. In a first example of the method, the method further comprises selectively coupling an intake manifold of the combustion engine to atmosphere via a throttle; selectively coupling the intake manifold of the combustion engine to the fuel vapor canister via a canister purge valve coupled within a purge line;

selectively coupling the fuel vapor canister to atmosphere via a canister vent valve coupled within a vent line; selectively coupling a fuel tank to the fuel vapor canister via a fuel tank isolation valve; and wherein coupling the cylinder that receives fuel from the fuel injector with undesired fuel outflow to the fuel vapor canister includes closing the throttle, closing the fuel tank isolation valve, opening the canister purge valve, and opening the canister vent valve, and wherein activating the pump to purge fuel vapors resulting from undesired fuel outflow to the fuel vapor canister includes activating the pump to apply vacuum on the cylinder that receives fuel from the fuel injector with undesired fuel outflow. A second example of the method optionally includes the first examples and further comprises during purging fuel vapor from the cylinder that receives fuel from the fuel injector with undesired fuel outflow to the fuel vapor canister; monitoring temperature of the fuel vapor canister by a temperature sensor positioned within the fuel vapor canister near the vent line; and responsive to an indication of a fuel vapor canister temperature increase above a threshold: deactivating the pump; closing the canister purge valve; and spinning the combustion engine unfueled to close the intake valve and exhaust valve on the cylinder that receives fuel from the fuel injector with undesired fuel outflow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
monitoring a fuel injector that supplies fuel to cylinder of an engine, the cylinder having intake and exhaust valves; and
following an engine-off event and responsive to an undesired fuel outflow from the fuel injector:
positioning the intake valve and the exhaust valve to respective open and closed positions;
coupling the cylinder to a fuel vapor storage canister;
purging fuel vapors from the undesired fuel outflow through the intake valve to the canister; and
during the purging fuel vapors from the undesired fuel outflow through the intake valve to the canister, monitoring a pressure in a fuel rail coupled to a plurality of fuel injectors, and, responsive to fuel rail pressure reaching a fuel rail pressure threshold, coupling an exhaust manifold of the engine to the canister to purge fuel vapors in the exhaust manifold to the canister.

2. The method of claim 1, further comprising:
propelling the vehicle by either the engine or an electric motor; and
wherein following the engine-off event, positioning the intake valve and the exhaust valve to respective open and closed positions includes spinning the engine unfueled with the electric motor until the intake valve is open and the exhaust valve is closed.

3. The method of claim 2, further comprising:
selectively coupling an intake manifold of the engine to atmosphere via a throttle;
selectively coupling the intake manifold of the engine to the fuel vapor storage canister via a canister purge valve coupled within a purge line;
selectively coupling the fuel vapor storage canister to atmosphere via a canister vent valve coupled within a vent line;
selectively coupling a fuel tank to the fuel vapor storage canister via a fuel tank isolation valve; and
wherein coupling the cylinder and/or the exhaust manifold to the fuel vapor storage canister includes closing the throttle, closing the fuel tank isolation valve, opening the canister purge valve, and opening the canister vent valve.

4. The method of claim 3, wherein a pump is positioned within the vent line, and wherein purging fuel vapors from the undesired fuel outflow includes activating the pump to apply vacuum on the cylinder that receives fuel from the fuel injector with undesired fuel outflow and/or on the exhaust manifold of the engine.

5. The method of claim 1, further comprising:
wherein monitoring the fuel injector includes indicating a fuel rail pressure decrease greater than a predetermined threshold, the fuel rail pressure decrease greater than the predetermined threshold indicating a fuel injector with undesired fuel outflow.

6. The method of claim 2, wherein coupling the exhaust manifold of the engine to the fuel vapor canister includes positioning the cylinder with the intake valve and exhaust valve open by spinning the engine unfueled.

7. The method of claim 1, further comprising:
selectively coupling the exhaust manifold to an intake manifold of the engine via an exhaust gas recirculation valve coupled within an exhaust gas recirculation passage; and
wherein coupling the exhaust manifold of the engine to the fuel vapor storage canister includes commanding open the exhaust gas recirculation valve.

8. The method of claim 4, further comprising:
during purging fuel vapors from the cylinder that receives fuel from the fuel injector with undesired fuel outflow and/or exhaust manifold to the fuel vapor storage canister,
monitoring temperature of the fuel vapor storage canister by a temperature sensor positioned within the fuel vapor storage canister near the vent line; and
responsive to an indication of a fuel vapor storage canister temperature increase above a threshold:
deactivating the pump;
closing the canister purge valve; and
spinning the engine unfueled to close the intake valve and exhaust valve on the cylinder that receives fuel from the fuel injector with undesired fuel outflow.

9. The method of claim 8, further comprising:
during purging the exhaust manifold to the fuel vapor storage canister,
monitoring the temperature of the fuel vapor storage canister by the temperature sensor positioned within the fuel vapor canister near the vent line; and
deactivating the pump and closing the canister purge valve responsive to a temperature plateau for a predetermined duration.

10. The method of claim 2, further comprising:
supplying pressurized fuel to the fuel rail at a key-on event; and
spinning the engine unfueled for a duration until a predetermined temperature is reached, the predetermined temperature comprising a temperature where liquid fuel trapped within the cylinder is likely to be vaporized.

11. A system for a vehicle, comprising:
an engine comprising one or more cylinders, each cylinder comprising an intake valve and an exhaust valve;
one or more fuel injectors, each supplying pressurized fuel to the one or more cylinders;
a fuel vapor canister coupled to an engine intake manifold via a canister purge valve;
a throttle coupled between the engine intake manifold and atmosphere;
a vacuum pump coupled between the fuel vapor canister and atmosphere;
a temperature sensor coupled within the fuel vapor canister; and
a controller configured with instructions stored in non-transitory memory, that when executed cause the controller to:
responsive to an indication of undesired fuel outflow from a fuel injector and following an engine-off event, position an engine cylinder receiving fuel from the fuel injector with undesired fuel outflow with the intake valve open and the exhaust valve closed;
close the throttle;
open the canister purge valve;
turn the vacuum pump on;
purge fuel vapors from the engine cylinder to the fuel vapor canister;
monitor a temperature of the fuel vapor canister via the temperature sensor; and
responsive to a temperature increase above a threshold, deactivate the vacuum pump and close the canister purge valve.

12. The system of claim 11, further comprising:
an electric motor coupled to the engine; and wherein
the controller is further configured with instructions stored in non-transitory memory, that when executed cause the controller to:
position the engine cylinder with the intake valve open and the exhaust valve closed by spinning the engine unfueled with the electric motor.

13. The system of claim 12, further comprising:
a fuel rail coupled to one or more fuel injectors;
a pressure sensor coupled to the fuel rail; and wherein
the controller is further configured with instructions stored in non-transitory memory, that when executed cause the controller to:
monitor pressure in the fuel rail; and
indicate undesired fuel outflow from a fuel injector responsive to a fuel rail pressure decrease greater than a predetermined threshold.

14. The system of claim 13, wherein the controller is further configured with instructions stored in non-transitory memory, that when executed cause the controller to:
during purging fuel vapors from the engine cylinder to the fuel vapor canister,
monitor the pressure in the fuel rail; and
responsive to a fuel rail pressure reaching a second threshold:
couple an exhaust manifold of the engine to the fuel vapor canister by spinning the engine unfueled to position the intake valve open and exhaust valve open;
activate the vacuum pump to purge fuel vapors from the exhaust manifold to the fuel vapor canister;
monitor the temperature of the fuel vapor canister by the temperature sensor positioned within the fuel vapor canister; and
deactivate the vacuum pump and close the canister purge valve responsive to a temperature plateau for a predetermined duration.

15. The system of claim 14, further comprising:
an exhaust gas recirculation passage positioned between the intake manifold and the exhaust manifold;
an exhaust gas recirculation valve coupled within the exhaust gas recirculation passage; and wherein
the controller is further configured with instructions stored in non-transitory memory, that when executed cause the controller to:
responsive to the fuel rail pressure reaching the second threshold, control the intake valve and the exhaust valve to a default conformation, and couple the exhaust manifold of the engine to the fuel vapor canister by commanding open the exhaust gas recirculation valve.

16. A method comprising:
propelling a vehicle by either a engine or an electric motor;
monitoring a plurality of fuel injectors that supply pressurized fuel from a fuel rail to a plurality of cylinders in the engine; and responsive to an indication of a fuel injector with undesired fuel outflow:
in a first condition, including an engine-on condition, adjust an air/fuel ratio to compensate for excess fuel in a cylinder receiving fuel from the fuel injector with undesired fuel outflow; and
in a second condition, including an engine-off condition, positioning the cylinder that receives fuel from the fuel injector with undesired fuel outflow with an intake valve open and an exhaust valve closed by spinning the engine unfueled via the electric motor;
coupling the cylinder to a fuel vapor canister, the fuel vapor canister configured to store vaporized hydrocarbons;
activating a pump to purge fuel vapors resulting from undesired fuel outflow to the fuel vapor canister until a pressure in the fuel rail is below a threshold pressure, and then purging fuel vapors from an exhaust manifold of the engine to the fuel vapor storage canister, responsive to an indication that a fuel vapor storage canister load is not greater than a threshold load during the purging fuel vapors from the cylinder and/or from the exhaust manifold, wherein the canister load is indicated via a temperature sensor positioned within the fuel vapor storage canister; and
discontinuing the purging the fuel vapors resulting from undesired fuel outflow and/or from the exhaust manifold in response to the canister load reaching the threshold load.

17. The method of claim 16, further comprising:
selectively coupling an intake manifold of the combustion engine to atmosphere via a throttle;
selectively coupling the intake manifold of the combustion engine to the fuel vapor canister via a canister purge valve coupled within a purge line;
selectively coupling the fuel vapor canister to atmosphere via a canister vent valve coupled within a vent line;
selectively coupling a fuel tank to the fuel vapor canister via a fuel tank isolation valve; and
wherein coupling the cylinder that receives fuel from the fuel injector with undesired fuel outflow to the fuel vapor canister includes closing the throttle, closing the fuel tank isolation valve, opening the canister purge valve, and opening the canister vent valve, and wherein activating the pump to purge fuel vapors resulting from undesired fuel outflow to the fuel vapor canister includes activating the pump to apply vacuum on the cylinder that receives fuel from the fuel injector with undesired fuel outflow.

18. The method of claim 17, wherein:
discontinuing the purging the fuel vapors includes:
deactivating the pump;
closing the canister purge valve; and
spinning the combustion engine unfueled to close the intake valve and the exhaust valve on the cylinder that receives fuel from the fuel injector with undesired fuel outflow.

19. The method of claim 17, wherein purging fuel vapors from the exhaust manifold of the engine to the fuel vapor storage canister further comprises one of positioning the cylinder that receives fuel from the fuel injector with undesired fuel outflow with the intake valve open and the exhaust valve open by spinning the engine unfueled via the electric motor, or via commanding open an exhaust gas recirculation valve coupled within an exhaust gas recirculation passage, the exhaust gas recirculation passage positioned between the intake manifold and the exhaust manifold.

* * * * *